US010901151B2

(12) United States Patent
Cho et al.

(10) Patent No.: US 10,901,151 B2
(45) Date of Patent: Jan. 26, 2021

(54) OPTICAL INTEGRATED CIRCUITS

(71) Applicant: Samsung Electronics Co., Ltd., Suwon-si (KR)

(72) Inventors: Keun-Yeong Cho, Suwon-si (KR); Ho-Chul Ji, Seongnam-si (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 16/217,711

(22) Filed: Dec. 12, 2018

(65) Prior Publication Data

US 2019/0317282 A1 Oct. 17, 2019

(30) Foreign Application Priority Data

Apr. 11, 2018 (KR) ........................ 10-2018-0042321

(51) Int. Cl.
*G02B 6/122* (2006.01)
*G02B 6/132* (2006.01)
*G02B 6/124* (2006.01)
*G02B 6/13* (2006.01)
*G02B 6/12* (2006.01)
*G02B 6/125* (2006.01)
*G02B 6/136* (2006.01)

(52) U.S. Cl.
CPC ............. *G02B 6/1228* (2013.01); *G02B 6/12* (2013.01); *G02B 6/122* (2013.01); *G02B 6/12002* (2013.01); *G02B 6/124* (2013.01); *G02B 6/12004* (2013.01); *G02B 6/131* (2013.01); *G02B 6/125* (2013.01); *G02B 6/136* (2013.01); *G02B 2006/12061* (2013.01); *G02B 2006/12083* (2013.01); *G02B 2006/12147* (2013.01)

(58) Field of Classification Search
None
See application file for complete search history.

(56) References Cited

U.S. PATENT DOCUMENTS

| 7,065,271 B2 | 6/2006 | Zheng et al. |
| 7,245,803 B2 | 7/2007 | Gunn, III et al. |
| 8,165,437 B2 | 4/2012 | Pyo et al. |
| 8,791,405 B2 | 7/2014 | Ji et al. |
| 9,103,974 B2 | 8/2015 | Kang et al. |
| 9,435,946 B2 | 9/2016 | Sakakibara et al. |
| 9,715,064 B1 | 7/2017 | Gambino et al. |
| 9,746,607 B2 | 8/2017 | Collins et al. |
| 2004/0057667 A1* | 3/2004 | Yamada ............... G02B 6/1228 385/43 |
| 2009/0297093 A1* | 12/2009 | Webster ............... G02B 6/1228 385/14 |

(Continued)

FOREIGN PATENT DOCUMENTS

KR 10-2013-0008299 1/2013

*Primary Examiner* — Michelle R Connelly
(74) *Attorney, Agent, or Firm* — Myers Bigel, P.A.

(57) ABSTRACT

Optical integrated circuits are provided. An optical integrated circuit includes a substrate including a single crystalline semiconductor material. The optical integrated circuit includes an insulation region in a trench in the substrate. The optical integrated circuit includes a first core on the insulation region. The first core includes the single crystalline semiconductor material. Moreover, the optical integrated circuit includes a second core that is spaced apart from the first core. The second core includes a material having a refractive index that is lower than that of the first core.

14 Claims, 15 Drawing Sheets

(56) References Cited

U.S. PATENT DOCUMENTS

| | | | |
|---|---|---|---|
| 2013/0015546 A1 | 1/2013 | Joe et al. | |
| 2014/0294341 A1* | 10/2014 | Hatori | G02B 6/12 385/14 |
| 2014/0376859 A1* | 12/2014 | Joe | G02B 6/12004 385/14 |
| 2017/0052317 A1* | 2/2017 | Mahgerefteh | G02B 6/124 |
| 2018/0100970 A1* | 4/2018 | Park | G02B 6/1228 |

* cited by examiner

OPTICAL INTEGRATED CIRCUITS

CROSS-REFERENCE TO RELATED APPLICATION

This application claims priority under 35 USC § 119 to Korean Patent Application No. 10-2018-0042321, filed on Apr. 11, 2018 in the Korean Intellectual Property Office (KIPO), the contents of which are herein incorporated by reference in their entirety.

BACKGROUND

The present disclosure relates to optical integrated circuits. As the enhancement of data transfer rate by electrical integrated circuits reaches the limit, methods of transferring data by optical integrated circuits have been developed. If optical integrated circuits are formed on a silicon-on-insulator (SOI) substrate, the production cost may increase due to the high cost of the SOI substrate, and thus methods of manufacturing optical integrate circuits on a bulk substrate have been recently developed. To manufacture optical integrated circuits on a bulk substrate, amorphous silicon may be deposited and regrown to form optical devices. The light loss of the optical devices, however, may be undesirably high.

SUMMARY

Example embodiments provide optical integrated circuits having improved characteristics.

An optical integrated circuit, according to example embodiments, may include a substrate including a single crystalline semiconductor material. The optical integrated circuit may include an insulation region in a trench in the substrate. The optical integrated circuit may include an active device including a first core on the insulation region. The first core may include the single crystalline semiconductor material. Moreover, the optical integrated circuit may include a passive device including a second core that is spaced apart from the first core. The second core may include a material including a refractive index that is lower than that of the first core.

According to example embodiments, an optical integrated circuit is provided. The optical integrated circuit may include a substrate including single crystalline silicon. The optical integrated circuit may include a first insulation region in a trench in the substrate. The optical integrated circuit may include a first core directly contacting an upper surface of the first insulation region and including single crystalline silicon. An entirety of a lowermost surface of the first core may overlap the first insulation region in a vertical direction that is substantially perpendicular to an upper surface of the substrate. The optical integrated circuit may include a second insulation region on the substrate and the first insulation region, and on an upper surface and side surfaces of the first core. Moreover, the optical integrated circuit may include a second core on the second insulation region. The second core may at least partially overlap the first core in the vertical direction and may include silicon nitride.

According to example embodiments, an optical integrated circuit is provided. The optical integrated circuit may include a single crystalline semiconductor substrate. The optical integrated circuit may include a first insulation region in a trench in the single crystalline semiconductor substrate. The optical integrated circuit may include a single crystalline semiconductor region contacting an upper surface of the first insulation region. An entirety of a lowermost surface of the single crystalline semiconductor region may overlap the first insulation region in a vertical direction that is substantially perpendicular to an upper surface of the single crystalline semiconductor substrate. The optical integrated circuit may include a material contacting the upper surface of the first insulation region and including a refractive index that is lower than that of the single crystalline semiconductor region and higher than that of the first insulation region. An entirety of a lowermost surface of the material may overlap the first insulation region in the vertical direction. The material may be spaced apart from the single crystalline semiconductor region in a horizontal direction that is substantially parallel to the upper surface of the single crystalline semiconductor substrate. Moreover, the optical integrated circuit may include a second insulation region on the single crystalline semiconductor substrate and the first insulation region, and on the material and the single crystalline semiconductor region. The refractive index of the material may be higher than that of the second insulation region.

In example embodiments, the active device requiring a high speed transfer may include single crystalline silicon, while the passive device requiring low light loss may include a material having a low refractive index, e.g., silicon nitride, so that the optical integrated circuits may have improved characteristics.

DETAILED DESCRIPTION

Example embodiments will be more clearly understood from the following detailed description taken in conjunction with the accompanying drawings.

Figure 1A:
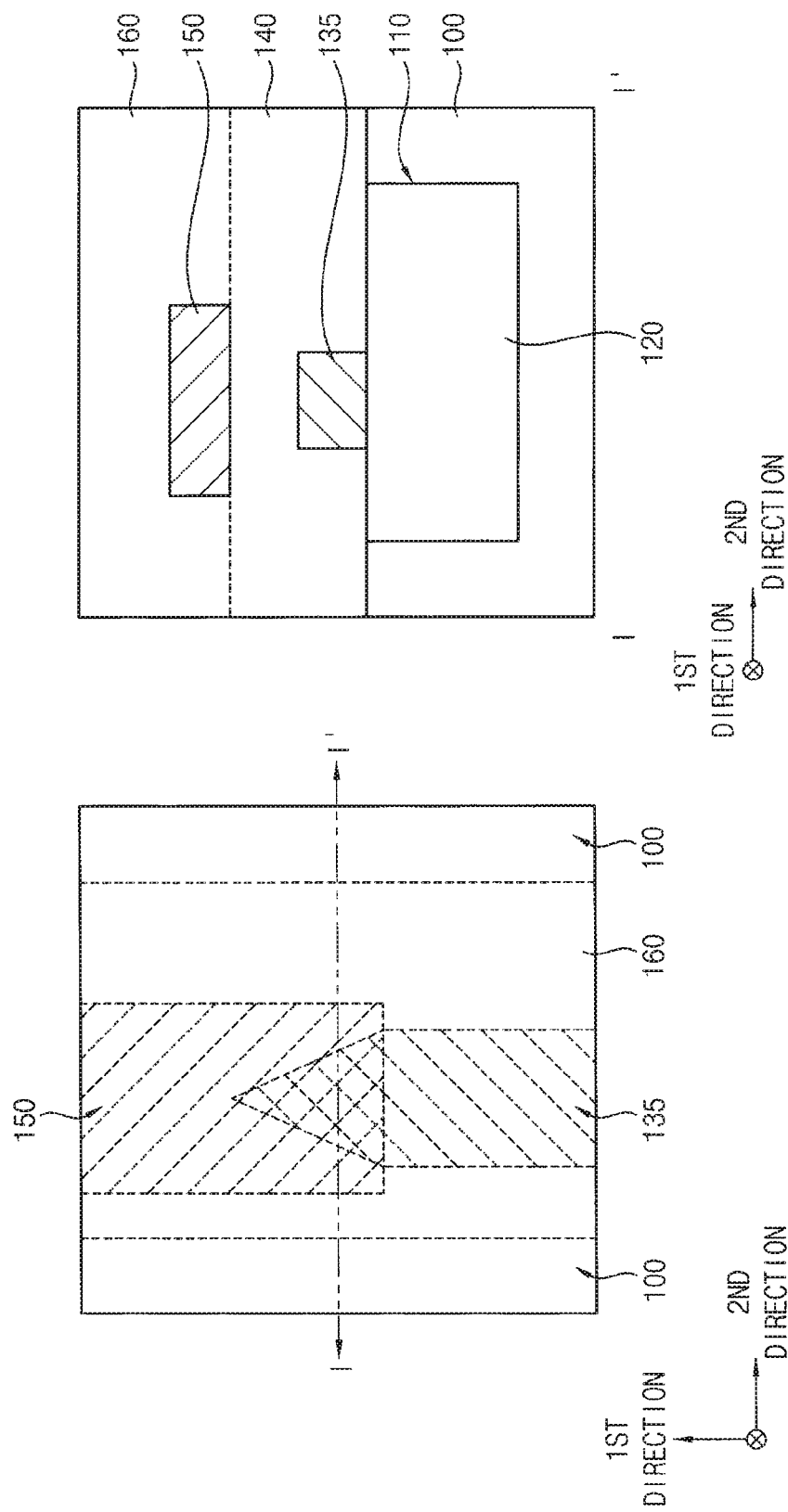
FIG. 1A includes a plan view and a cross-sectional view illustrating optical integrated circuits in accordance with example embodiments.
Figure 1B:
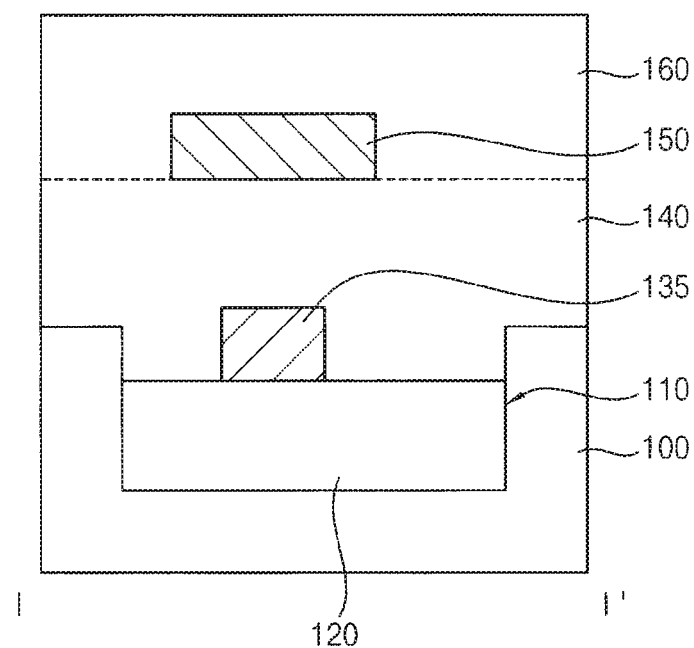
FIG. 1B is a cross-sectional view illustrating optical integrated circuits in accordance with example embodiments.

FIG. 1A includes a plan view and a cross-sectional view illustrating optical integrated circuits in accordance with example embodiments, and FIG. 1B is a cross-sectional view illustrating optical integrated circuits in accordance with example embodiments. Each of the cross-sectional views is taken along a line I-I' of the plan view in FIG. 1A.

Referring to FIG. 1A, the optical integrated circuits may include a first cladding 120 in a trench 110 on/in a substrate 100, a first core 135 on the first cladding 120, a second cladding 140 on (e.g., covering) the first core 135 on the substrate 100 and the first cladding 120, a second core 150 partially overlapping the first core 135 in a vertical direction substantially perpendicular to an upper surface of the substrate 100 on the second cladding 140, and a third cladding 160 on (e.g., covering) the second core 150 on the second cladding 140. One or more of the claddings 120, 140, 160 may be an insulation layer/region, and thus may be referred to herein as an "insulation layer" or an "insulation region."

The substrate 100 may include a semiconductor material, e.g., silicon, germanium, etc. In example embodiments, the substrate 100 may be a (100) single crystalline silicon wafer.

The trench 110 may extend, for example, in a first direction substantially parallel to the upper surface of the substrate 100. Accordingly, the first direction may be a first horizontal direction.

In example embodiments, an upper surface of the first cladding 120 may be substantially coplanar with an upper surface of a portion of the substrate 100 on which no trench is formed. The first cladding 120 may include a material having a refractive index lower than that of silicon, for example, silicon oxide or silicon oxynitride. The first cladding 120 may extend in the first direction according to the extension direction of the trench 110.

Alternatively, referring to FIG. 1B, the upper surface of the first cladding 120 may be lower than the upper surface of the substrate 100.

In example embodiments, the first core 135 may extend in the first direction on the first cladding 120. Thus, an entire portion (e.g., an entire lowermost surface) of the first core 135 may overlap the first cladding 120 in the vertical direction. In some example embodiments, an end of the first core 135 may have a tapered shape.

In example embodiments, a lower surface of the first core 135 directly contacting the upper surface of the first cladding 120 may be substantially coplanar with the upper surface of the portion of the substrate 100 on which no trench is formed. Alternatively, referring to FIG. 1B, the lower surface of the first core 135 may be lower than the upper surface of the substrate 100.

The second cladding 140 may include a material having a refractive index lower than that of silicon, for example, silicon oxide or silicon oxynitride. Thus, in some example embodiments, the second cladding 140 may include substantially the same material as that of the first cladding 120 to be merged therewith.

In example embodiments, the second core 150 may include a material having a refractive index lower than that of the first core 135 and higher than those of the first to third claddings 120, 140 and 160. Thus, the second core 150 may include, e.g., silicon nitride.

In example embodiments, the second core 150 may extend in the first direction on the second cladding 140, and an entire portion (e.g., an entire lowermost surface) of the second core 150 may overlap the first cladding 120 in the vertical direction.

In example embodiments, at least a portion of the second core 150 may overlap the first core 135 in the vertical direction, and thus optical signals may be efficiently transferred between the first and second cores 135 and 150. As shown in FIG. 1A, an end of the second core 150 overlaps the tapered end of the first core 135 in the vertical direction.

The third cladding 160 may include a material having a refractive index lower than that of silicon, for example, silicon oxide or silicon oxynitride. Thus, in some example embodiments, the third cladding 160 may include substantially the same material as that of the second cladding 140 to be merged therewith.

In example embodiments, the first core 135 and the first and second cladding 120 and 140 surrounding the first core 135 may form an active device of the optical integrated circuits. Thus, a wiring may be connected to the first core 135 and may be configured to supply electric power thereto. The active device may include, e.g., phase shifters, optical modulators, etc.

In example embodiments, the second core 150 and the second and third cladding 140 and 160 surrounding the second core 150 may form a first passive device of the optical integrated circuits. The first passive device may include, e.g., one or more optical waveguides.

In example embodiments, the first core 135 of the active device may include a single crystalline semiconductor material, e.g., single crystalline silicon, while the second core 150 of the first passive device may include a material having a refractive index lower than that of the first core 135 and higher than those of the first to third claddings 120, 140 and 160, e.g., silicon nitride. Accordingly, the first core 135 may be referred to herein as a "single crystalline semiconductor region," and the second core 150 may be referred to herein as a "material," such as an "insulating material."

The light loss generated during the transfer of optical signals via the second core 150 may be reduced when the second core 150 includes, e.g., silicon nitride rather than, e.g., single crystalline silicon. If the second core 150 instead includes single crystalline silicon, due to the incompleteness of the crystallization process in which amorphous silicon is crystallized to form single crystalline silicon, or due to the roughness of a sidewall formed by an etching process for forming the second core 150, a large amount of light loss may be generated. However, in example embodiments, the second core 150 includes silicon nitride having a low refractive index and does not have to be crystallized, and thus the light loss by the second core 150 may be reduced.

Accordingly, in the inventive concepts, the active device requiring a high speed transfer may include single crystalline silicon, while the passive device requiring low light loss may include a material having a low refractive index, e.g., silicon nitride, so that the optical integrated circuits may have improved characteristics.

Figure 2:
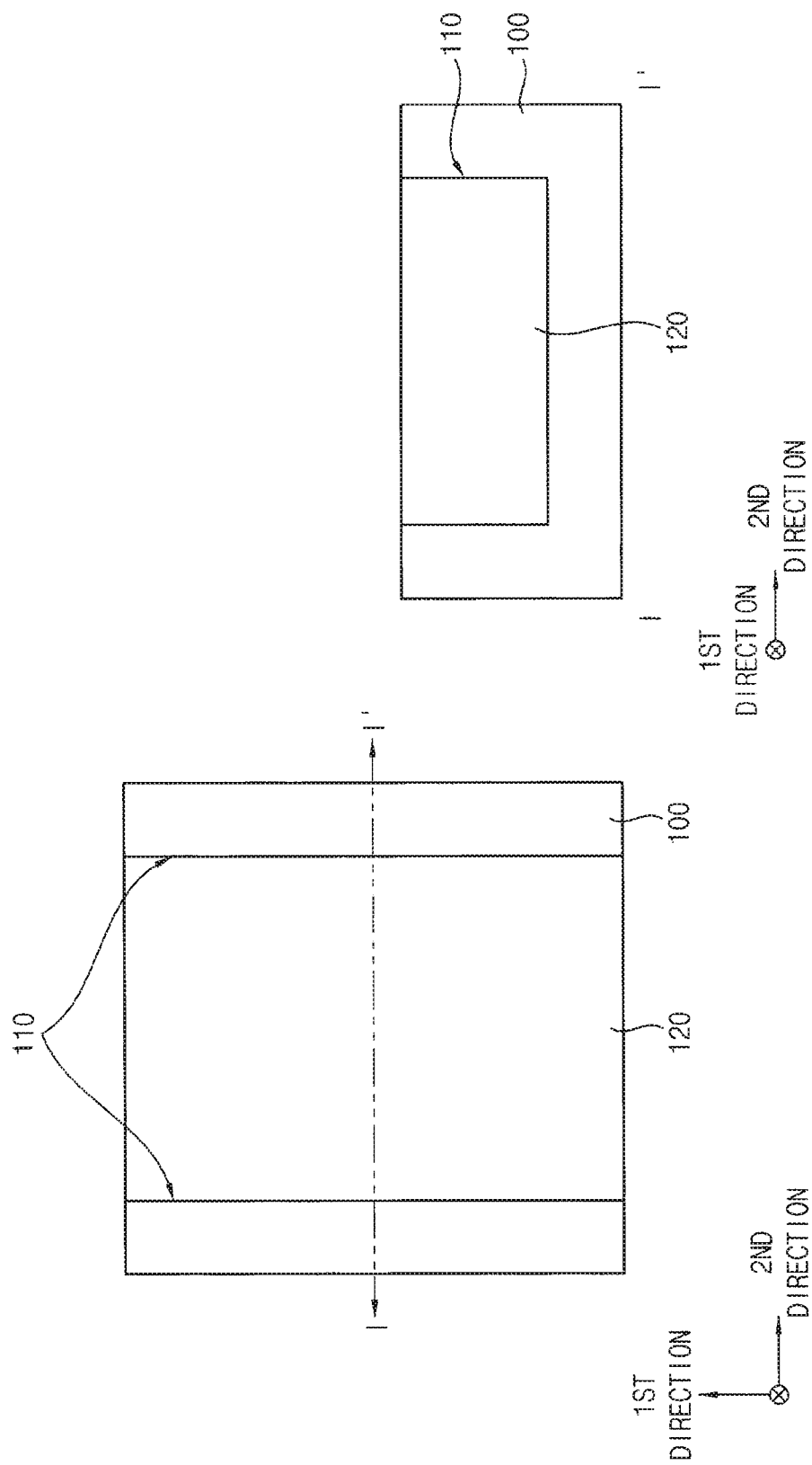
FIGS. 2 to 4 include plan views and cross-sectional views illustrating a method of manufacturing optical integrated circuits in accordance with example embodiments.
Figure 3:
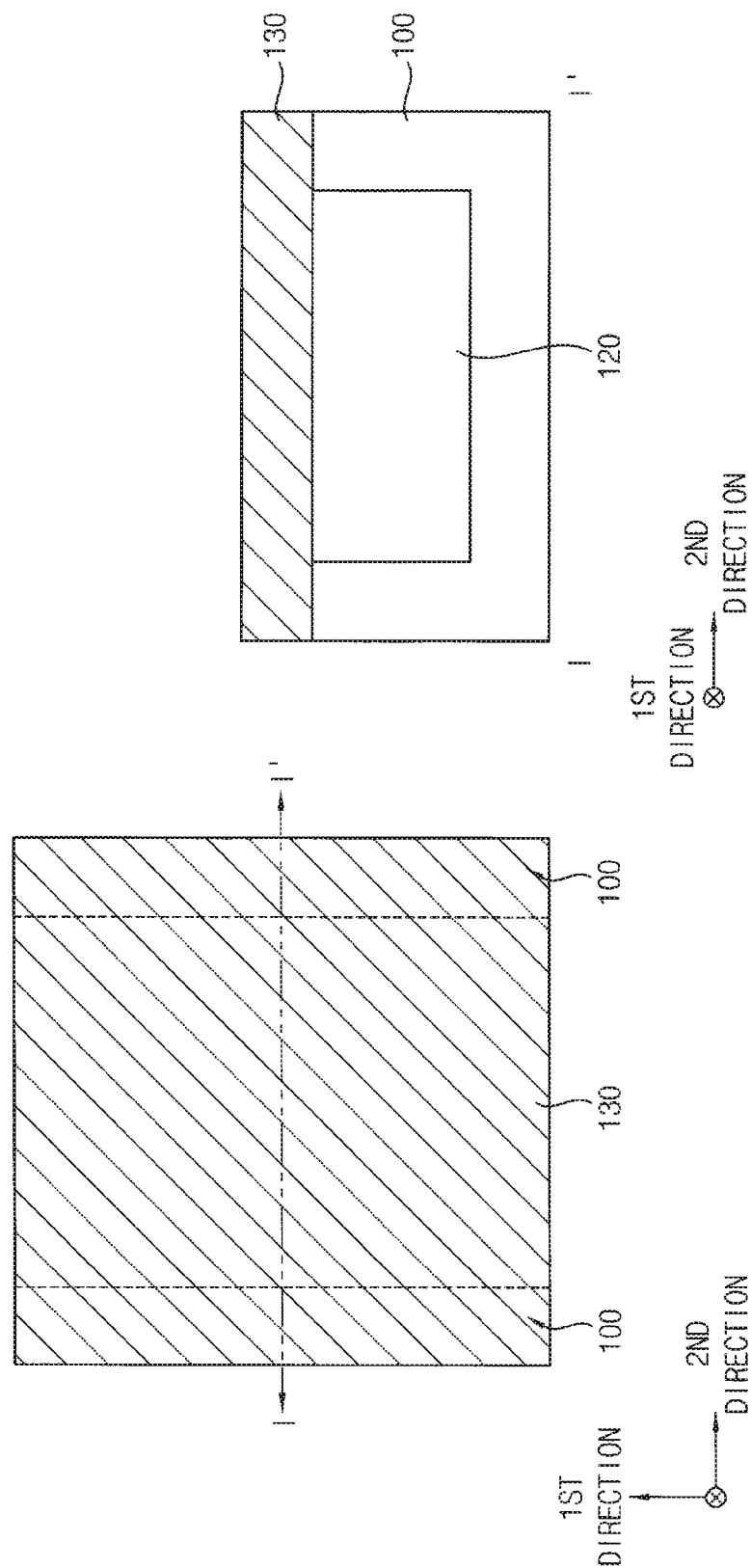
Figure 4:
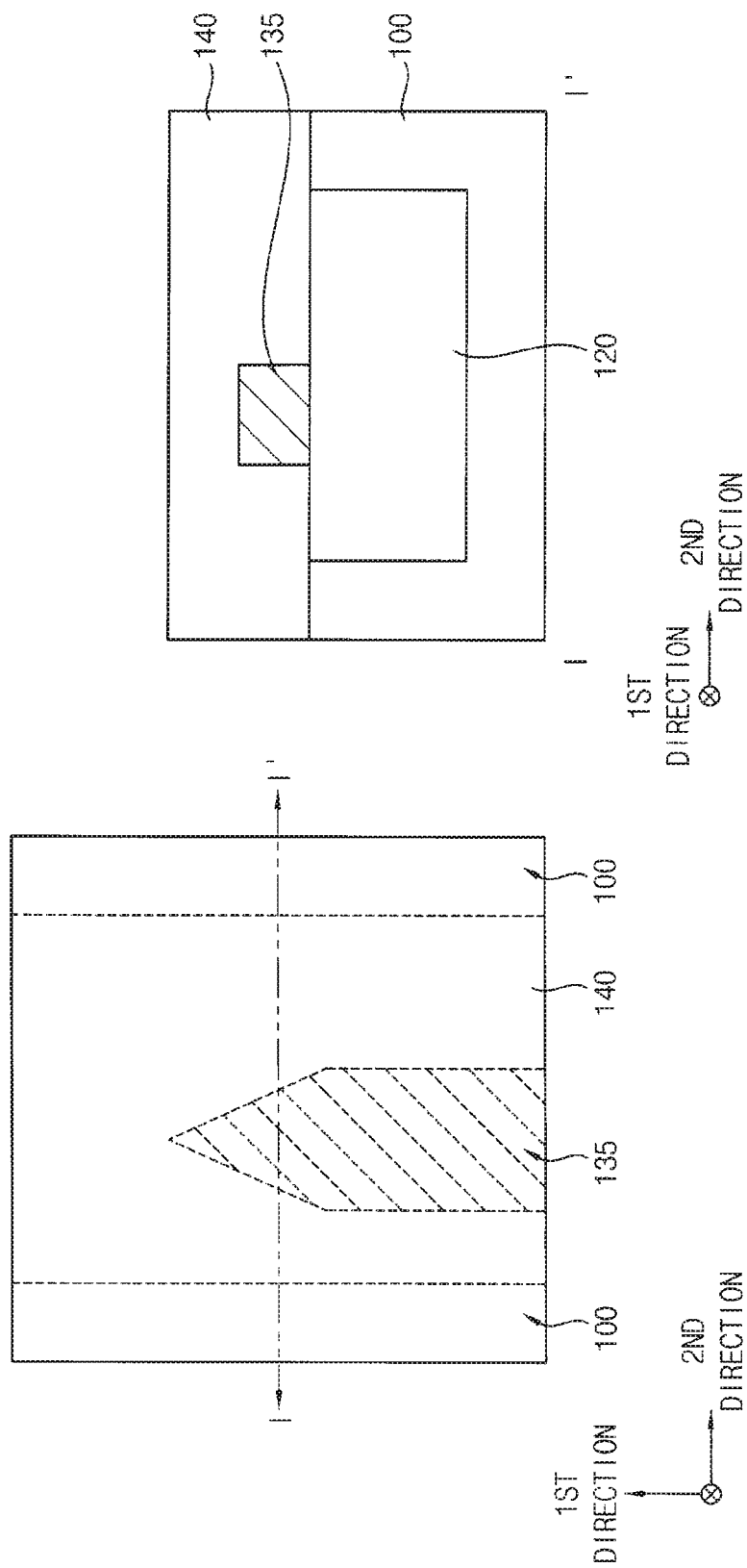

FIGS. 2 to 4 include plan views and cross-sectional views illustrating a method of manufacturing optical integrated circuits in accordance with example embodiments. The cross-sectional views are taken along lines I-I' of corresponding plan views, respectively.

Referring to FIG. 2, a trench 110 may be formed on/in a substrate 100, and a first cladding 120 may be formed in the trench 110.

The trench 110 may be formed by a dry etching process using a first photoresist pattern. The trench 110 may extend in a first direction substantially parallel to an upper surface of the substrate 100.

The first cladding 120 may be formed by forming a first insulation layer on the substrate 100 in (e.g., to fill) the trench 110, and planarizing the first insulation layer until the upper surface of the substrate 100 may be exposed. Thus, an upper surface of the first cladding 120 may be substantially coplanar with the upper surface of a portion of the substrate 100 on which no trench is formed. In example embodiments, the planarization process may be performed by a chemical mechanical polishing (CMP) process and/or an etch back process.

The first insulation layer may include, e.g., silicon oxide or silicon oxynitride, and may be formed by a chemical vapor deposition (CVD) process, an atomic layer deposition (ALD) process, a physical vapor deposition (PVD) process, etc.

The first cladding 120 may extend in the first direction according to (e.g., along) the extension direction of the trench 110.

Alternatively, referring to FIG. 1B, a portion of the first insulation layer at an upper portion of the trench 110 may be further removed so that the upper surface of the first cladding 120 may be lower than the upper surface of the substrate 100. The portion of the first insulation layer may be removed by, e.g., an etch back process.

Referring to FIG. 3, an amorphous semiconductor layer may be formed on the upper surfaces of the substrate 100 and the first cladding 120, and the amorphous semiconductor layer may be crystallized using the upper surface of the substrate 100 as a seed to form a single crystalline semiconductor layer 130.

The amorphous layer may include a semiconductor material, e.g., silicon, germanium, etc. In example embodiments, the amorphous semiconductor layer may be formed to include silicon by a CVD process, an ALD process, a PVD process, etc.

The single crystalline semiconductor layer 130 may be formed by annealing or emitting laser on the amorphous semiconductor layer. In example embodiments, the crystallization process may include a solid phase epitaxy (SPE) process, a laser epitaxial growth (LEG) process, etc.

Referring to FIG. 4, the single crystalline semiconductor layer 130 may be patterned to form a first core 135, and a second cladding 140 may be formed on the upper surfaces of the substrate 100 and the first cladding 120 to be on an upper surface and side surfaces of (e.g., to cover) the first core 135.

The first core 135 may be formed by etching the single crystalline semiconductor layer 130 through a dry etching process using a second photoresist pattern.

In example embodiments, the first core 135 may extend in the first direction on the first cladding 120. Thus, an entire portion of the first core 135 may overlap the first cladding 120 in a vertical direction substantially perpendicular to the upper surface of the substrate 100. In some example embodiments, an end of the first core 135 may have a tapered shape.

In example embodiments, a lower surface of the first core 135 directly contacting the upper surface of the first cladding 120 may be substantially coplanar with the upper surface of the portion of the substrate 100 on which no first cladding is formed. Alternatively, referring to FIG. 1B, the lower surface of the first core 135 may be lower than the upper surface of the portion of the substrate 100 on which no first cladding is formed.

The second cladding 140 may be formed by forming a second insulation layer on the substrate 100 and the first cladding 120 to cover the first core 135, and planarizing the second insulation layer. In some embodiments, the planarization process may be skipped.

The second insulation layer may include, e.g., silicon oxide or silicon oxynitride, and may be formed by a CVD process, an ALD process, a PVD process, etc. In some example embodiments, the second cladding 140 may include substantially the same material as that of the first cladding 120 to be merged therewith.

Referring to FIG. 1A again, after forming a second core 150 on the second cladding 140, a third cladding 160 may be formed on the second cladding 140 to be on an upper surface and side surfaces of (e.g., to cover) the second core 150, which may complete the fabrication of the optical integrated circuits.

The second core 150 may be formed by forming a second core layer on the second cladding 140, and patterning the second core layer. In example embodiments, the second core 150 may include a material having a refractive index lower than that of the first core 135 and higher than those of the first to third claddings 120, 140 and 160. Thus, the second core 150 may include, e.g., silicon nitride.

If the second core 150 is instead formed by forming an amorphous silicon layer, crystallizing the amorphous silicon, and patterning the crystallized silicon layer through an etching process, which may be similar to how the first core 135 is formed, light loss may be generated during the transfer of optical signals via the second core 150 due to the incompleteness of the crystallization process or due to the roughness of a sidewall formed by the etching process. However, in example embodiments, the second core 150 may include silicon nitride having a low refractive index and may not be crystallized, and thus the light loss generated by the second core 150 may be reduced.

In example embodiments, the second core 150 may extend in the first direction on the second cladding 140, and an entire portion of the second core 150 may overlap the first cladding 120 in the vertical direction. In example embodiments, at least a portion of the second core 150 may overlap the first core 135 in the vertical direction. As shown in FIG. 1A, an end of the second core 150 overlaps the tapered end of the first core 135 in the vertical direction.

The third cladding 160 may be formed by forming a third insulation layer on the second cladding 140 to cover the second core 150, and planarizing the third insulation layer. In some embodiments, the planarization process may be skipped.

The third insulation layer may include, e.g., silicon oxide or silicon oxynitride, and may be formed by a CVD process, an ALD process, a PVD process, etc. In some example embodiments, the third cladding 160 may include substantially the same material as that of the second cladding 140 to be merged therewith.

Figure 5:
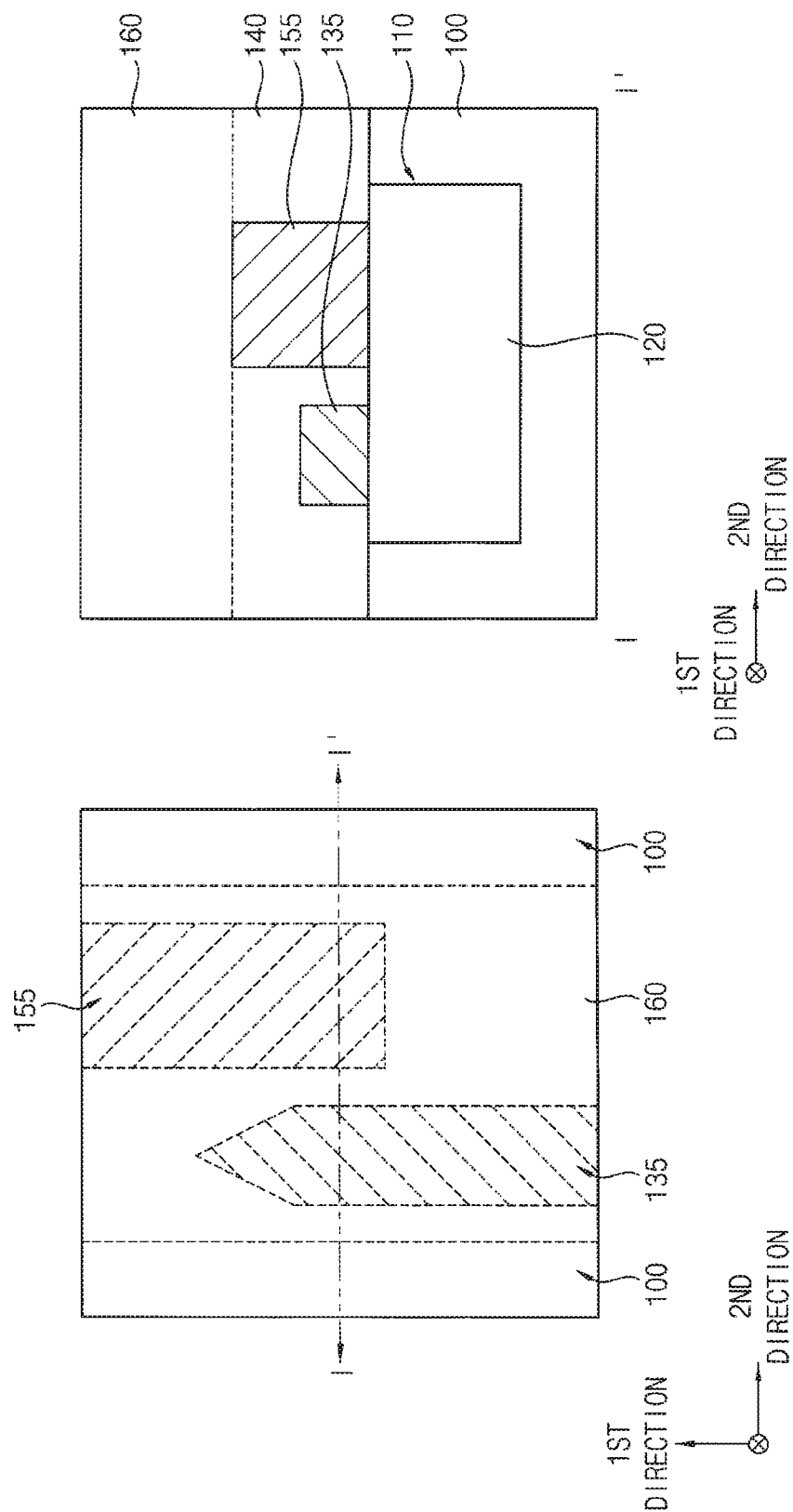
FIG. 5 includes a plan view and a cross-sectional view illustrating optical integrated circuits in accordance with example embodiments.

FIG. 5 includes a plan view and a cross-sectional view illustrating optical integrated circuits in accordance with example embodiments. The cross-sectional view is taken along a line I-I' of the plan view.

These optical integrated circuits may be substantially the same as or similar to those illustrated with reference to FIGS. 1A and 1B, except for the locations of the first and second cores. Thus, like reference numerals refer to like elements, and repeated detailed descriptions thereon may be omitted herein.

Referring to FIG. 5, the optical integrated circuits may include the first cladding 120 in the trench 110 on the substrate 100, the first core 135 and a third core 155 spaced apart from each other on the first cladding 120, and the second and third claddings 140 and 160 sequentially stacked on the substrate 100 and the first cladding 120 and on upper and side surfaces of (e.g., covering) the first and third cores 135 and 155.

In example embodiments, the third core 155 may extend in the first direction, and may partially overlap the first core 135 in a second direction (e.g., a second horizontal direction) substantially parallel to the upper surface of the substrate 100 and crossing the first direction. Accordingly, a portion of the third core 155 may extend in parallel (i.e., side-by-side) with a portion of the first core 135 in the first direction. Thus, optical signals may be efficiently transferred between the first and third cores 135 and 155. In example embodiments, the second direction may be substantially perpendicular to the first direction.

In example embodiments, the third core 155 may include a material having a refractive index lower than that of the first core 135 and higher than those of the first to third claddings 120, 140 and 160.

In example embodiments, the first core 135 and the first and second claddings 120 and 140 surrounding the first core 135 may form an active device of the optical integrated circuits, and the third core 155 and the second and third claddings 140 and 160 surrounding the third core 155 may form a second passive device of the optical integrated circuits.

In example embodiments, the first core 135 of the active device may include single crystalline semiconductor material, e.g., single crystalline silicon, while the third core 155 of the second passive device may include a material having a refractive index lower than that of the first core 135 and higher than those of the first to third claddings 120, 140 and 160, e.g., silicon nitride, and thus the light loss generated during the transfer of optical signals via the third core 155 may be reduced.

Figure 6:
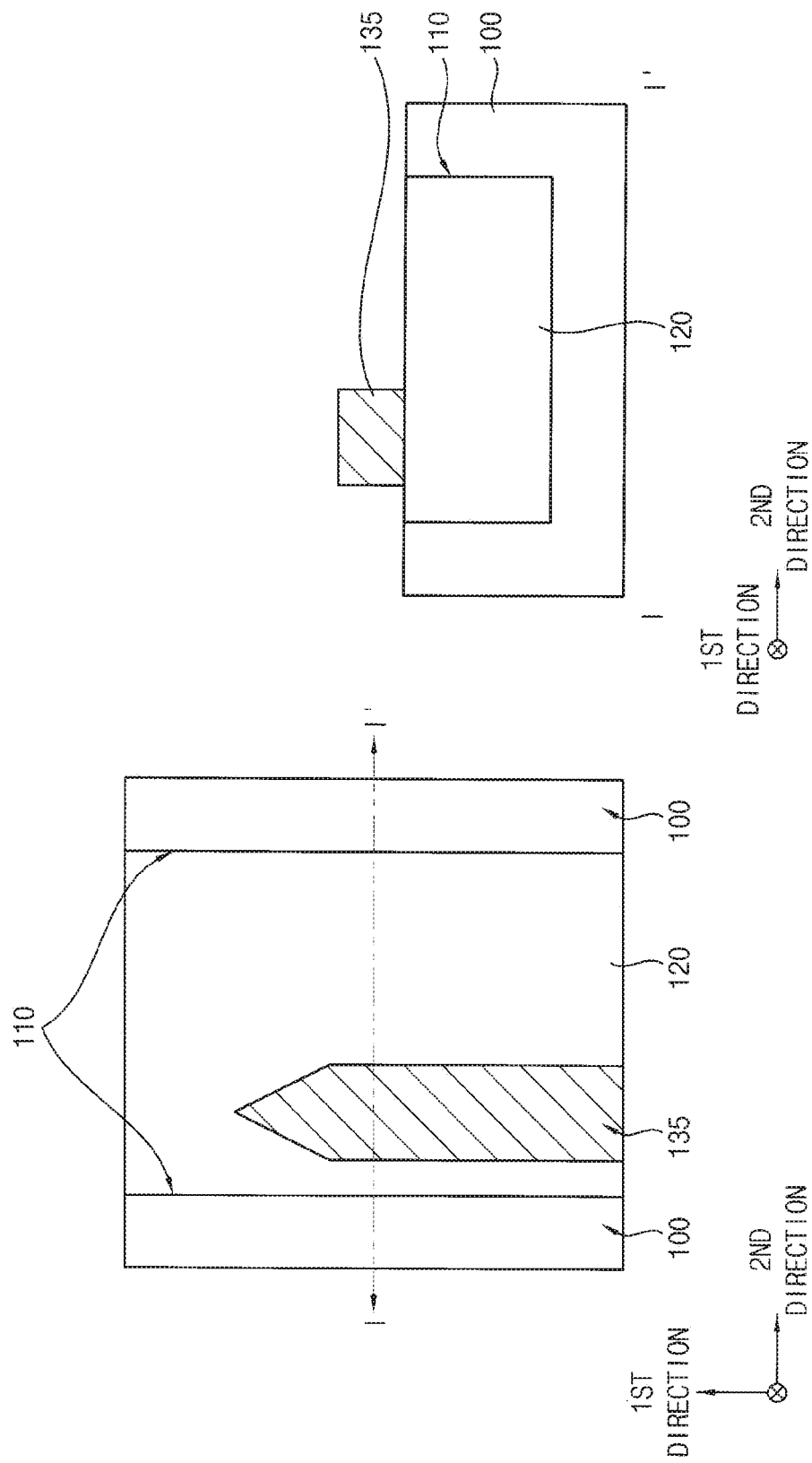
FIGS. 6 and 7 include plan views and cross-sectional views illustrating a method of manufacturing optical integrated circuits in accordance with example embodiments.
Figure 7:
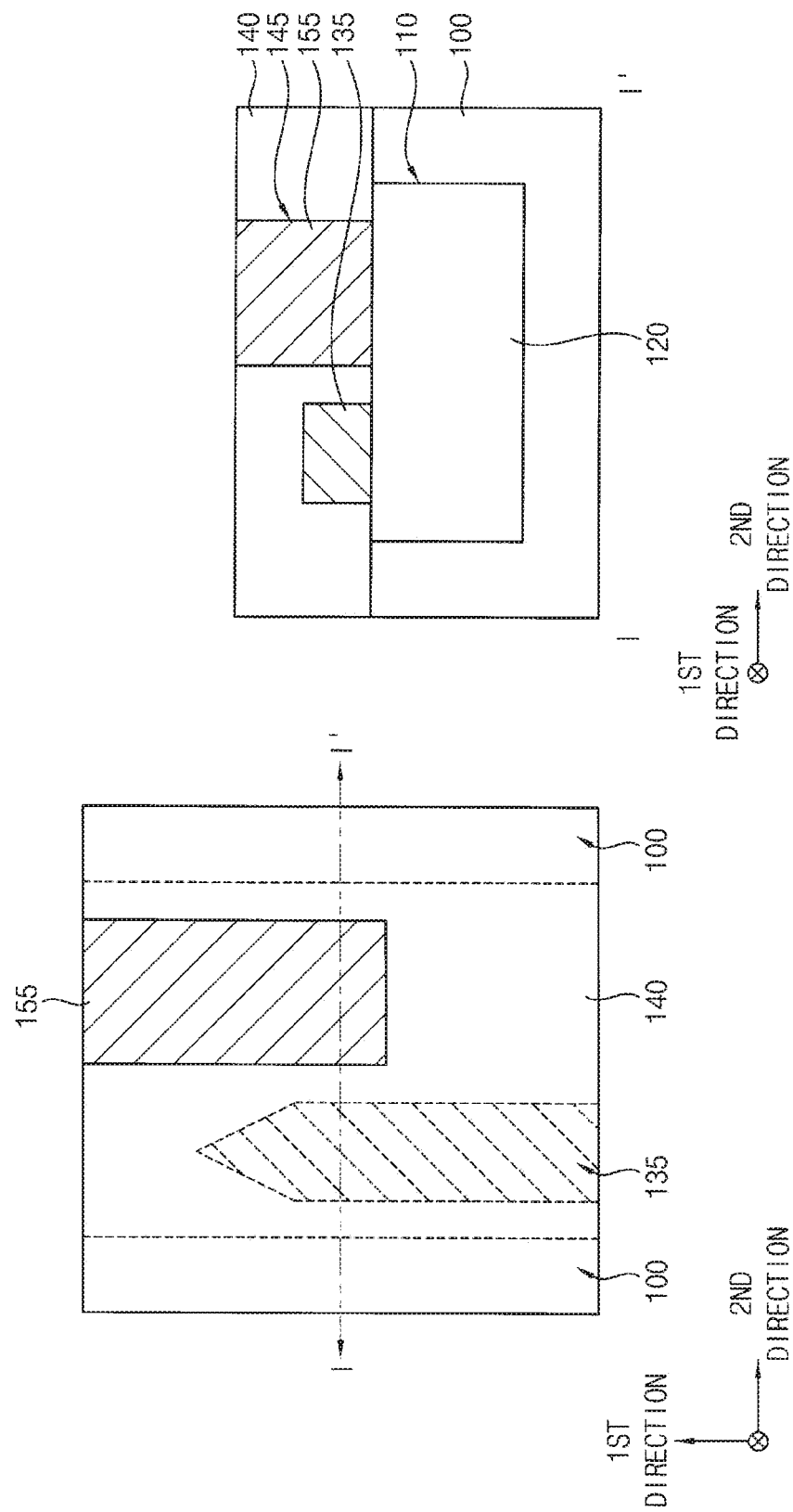

FIGS. 6 and 7 include plan views and cross-sectional views illustrating a method of manufacturing optical integrated circuits in accordance with example embodiments. The cross-sectional views are taken along lines I-I' of corresponding plan views, respectively.

This method may include processes substantially the same as or similar to those illustrated with reference to FIGS. 2 to 4 and FIGS. 1A and 1B, and thus repeated detailed descriptions thereon may be omitted herein.

Referring to FIG. 6, processes substantially the same as or similar to those illustrated with reference to FIGS. 2 to 4 may be performed. However, the second cladding 140 may not be formed.

Thus, the first core 135 may be formed to extend in the first direction on the first cladding 120 in the trench 110 on the substrate 100.

Referring to FIG. 7, the second cladding 140 may be formed on the first cladding 120 to cover the first core 135, and a third core 155 may be formed through the second cladding 140.

The third core 155 may be formed by forming a first opening 145 through the second cladding 140 to be spaced apart from the first core 135 and to expose a portion of the upper surface of the first cladding 120, forming a third core layer on the exposed portion of the upper surface of the first cladding 120 and the upper surface of the second cladding 140 to partially or completely fill the first opening 145, and planarizing the third core layer until the upper surface of the second cladding 140 may be exposed.

In example embodiments, the first opening 145 may extend in the first direction, and thus the third core 155 in the first opening 145 may also extend in the first direction. The first opening 145 and the third core 155 may partially overlap the first core 135 in the second direction.

In example embodiments, the third core 155 may include a material having a refractive index lower than that of the first core 135 and higher than those of the first and second claddings 120 and 140, e.g., silicon nitride. In some example embodiments, the second cladding 140 may include substantially the same material as that of the first cladding 120 to be merged therewith.

Referring to FIG. 5 again, a third cladding 160 may be formed on the second cladding 140 and the third core 155 to complete the fabrication of the optical integrated circuits.

In some example embodiments, the third cladding 160 may include substantially the same material as that of the second cladding 140 to be merged therewith.

Figure 8:
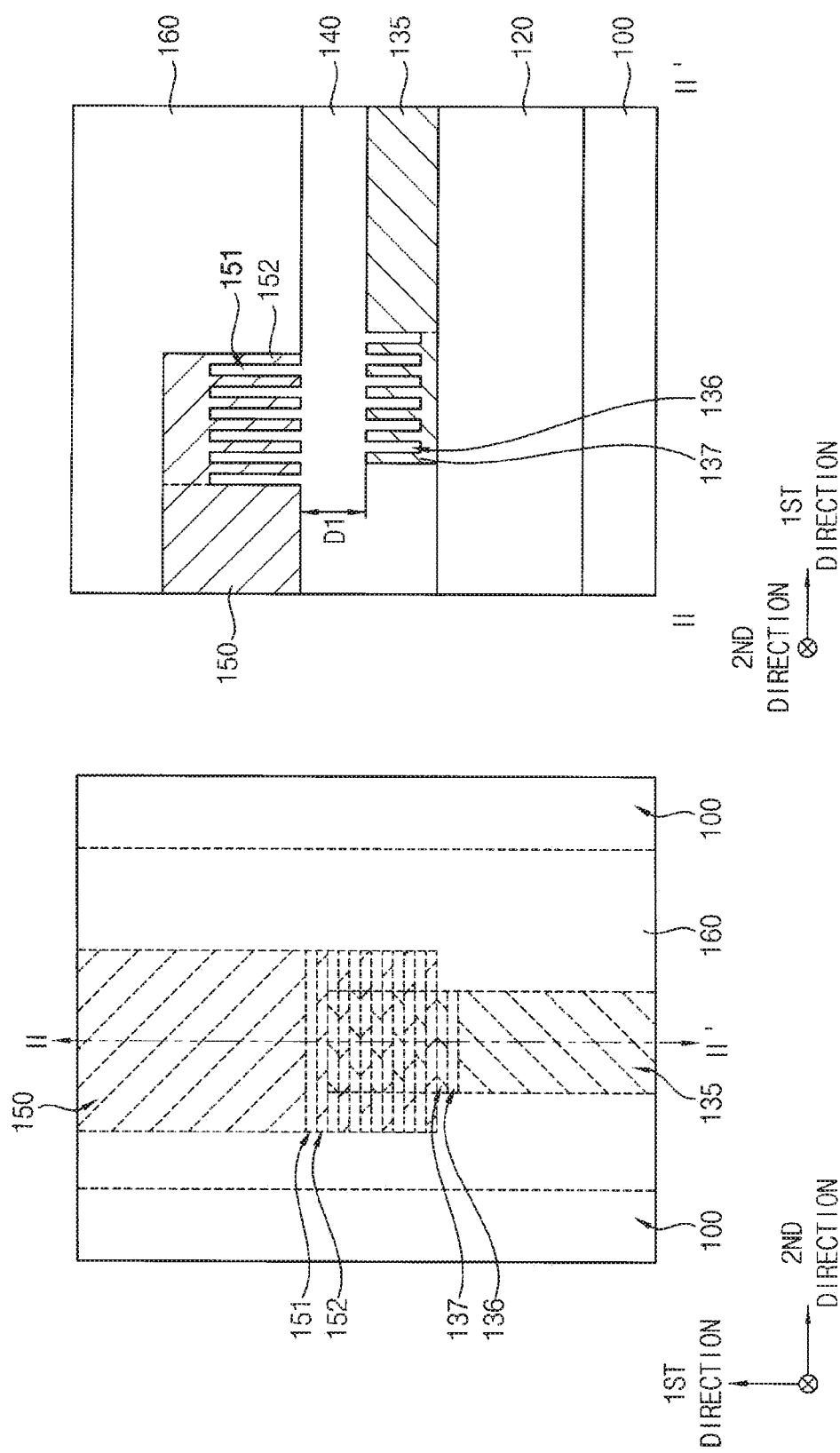
FIG. 8 includes a plan view and a cross-sectional view illustrating optical integrated circuits in accordance with example embodiments.

FIG. 8 includes a plan view and a cross-sectional view illustrating optical integrated circuits in accordance with example embodiments. The cross-sectional view is taken along a line II-IF of the plan view.

These optical integrated circuits may be substantially the same as or similar to those illustrated with reference to FIGS. 1A and 1B, except for third and fourth passive devices. Thus, like reference numerals refer to like elements, and repeated detailed descriptions thereon may be omitted herein.

Referring to FIG. 8, the optical integrated circuits may include the first cladding 120 in the trench 110 on the substrate 100, the first core 135 and a fourth core 137 connected with each other on the first cladding 120, the second cladding 140 covering the first and fourth cores 135 and 137 on the substrate 100 and the first cladding 120, the second core 150 and a fifth core 152 connected with each other on the second cladding 140, and the third cladding 160 covering the second and fifth cores 150 and 152 on the second cladding 140.

The fourth core 137 may be connected to an end of the first core 135 in the first direction, and may include substantially the same material as that of the first core 135. The fourth core 137 may include a plurality of first recesses 136 on an upper surface thereof.

Protrusions 142 (refer to FIG. 10) may be formed at upper portions of the second cladding 140, which may correspond to (e.g., vertically overlap) the fourth core 137 and protrude upwardly in the vertical direction, and thus second recesses 141 (refer to FIG. 10) may be formed between the protrusions 142.

In example embodiments, one or more of (e.g., each of) the protrusions 142 may at least partially overlap the fourth core 137 in the vertical direction, and a width of each of the protrusions 142 in the second direction may be greater than that of each protrusion of the fourth core 137 in the second direction.

The fifth core 152 may be connected to an end of the second core 150 in the first direction to partially or completely fill the second recesses 141, and may include substantially the same material as that of the second core 150.

The fifth core 152 may have a thickness in the vertical direction greater than those of the protrusions 142 at the upper portions of the second cladding 140 so as to cover upper surfaces of the protrusions 142, and third recesses 151 may be formed on a lower surface of the fifth core 152, which may correspond to (e.g., may replace) the protrusions 142. In example embodiments, widths of the second and fifth cores 150 and 152 in the second direction may be substantially equal to those of the protrusions 142 at the upper portions of the second cladding 140 in the second direction.

In example embodiments, the second and fifth cores 150 and 152 may include a material having a refractive index lower than that of the first and fourth cores 135 and 137 and higher than that of the first and second claddings 120 and 140, e.g., silicon nitride.

The fourth core 137 and the first and second claddings 120 and 140 surrounding the fourth core 137 may form a third passive device, and the fifth core 152 and the second and third claddings 140 and 160 surrounding the fifth core 152 may form a fourth passive device. The third and fourth passive devices may form first and second optical couplers, respectively. Thus, optical signals may be directly transferred between the first and second optical couplers spaced apart from each other by a first distance D1 in the vertical direction and at least partially overlapping with each other in the vertical direction.

As illustrated above, the second and fifth cores 150 and 152 may include, e.g., silicon nitride, and thus light loss may be reduced.

Figure 9:
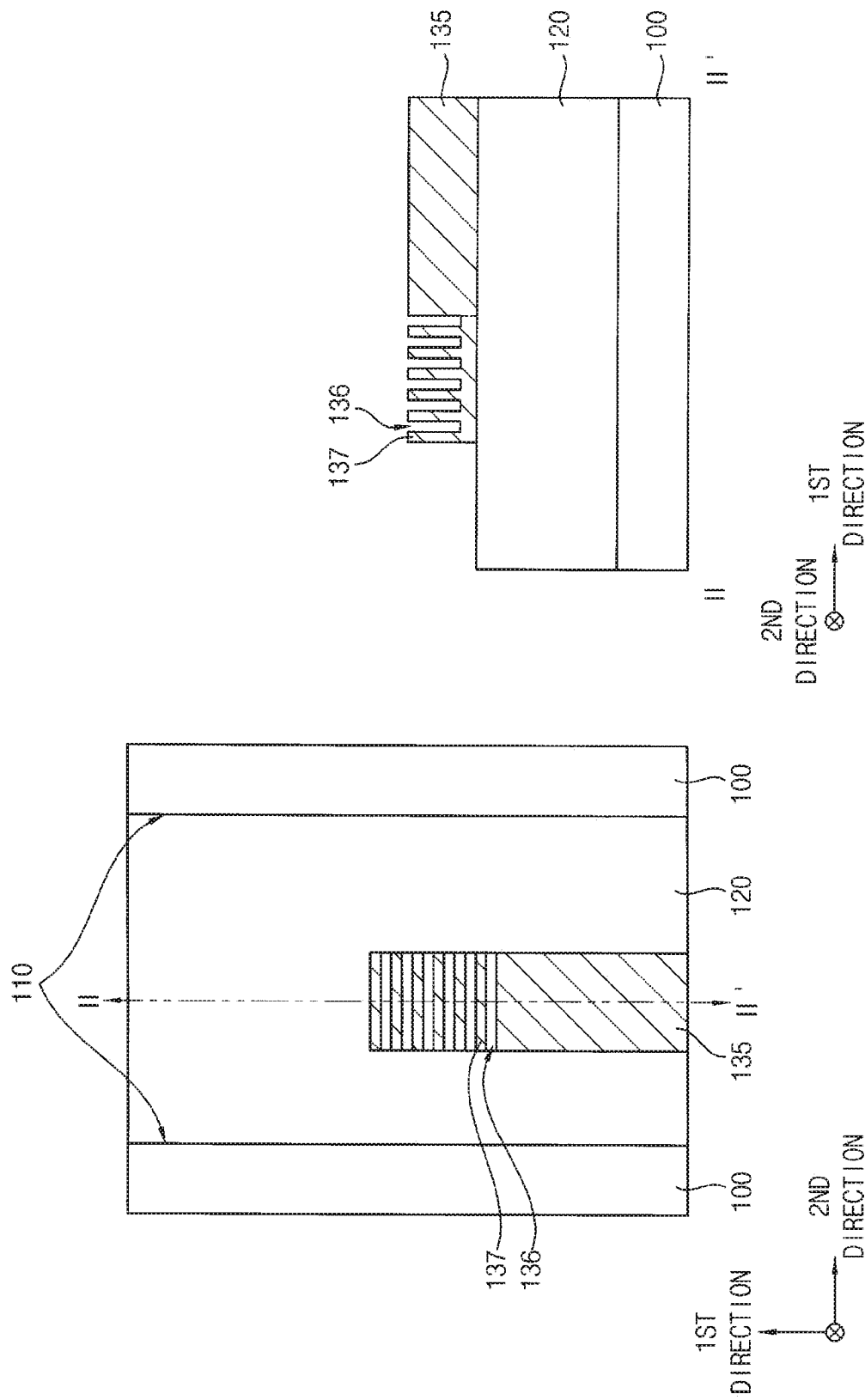
FIGS. 9 to 11 include plan views and cross-sectional views illustrating a method of manufacturing optical integrated circuits in accordance with example embodiments.
Figure 10:
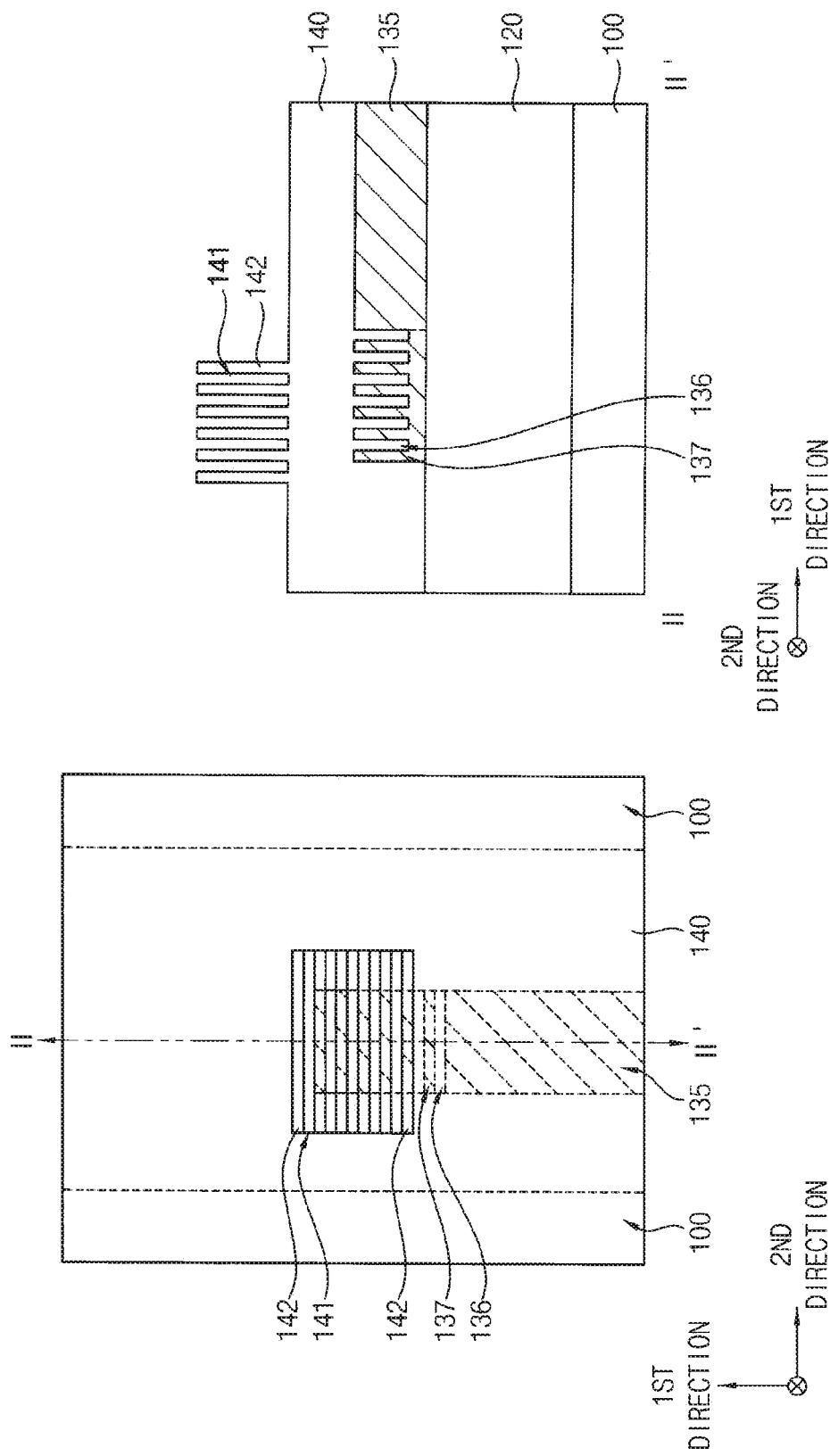
Figure 11:
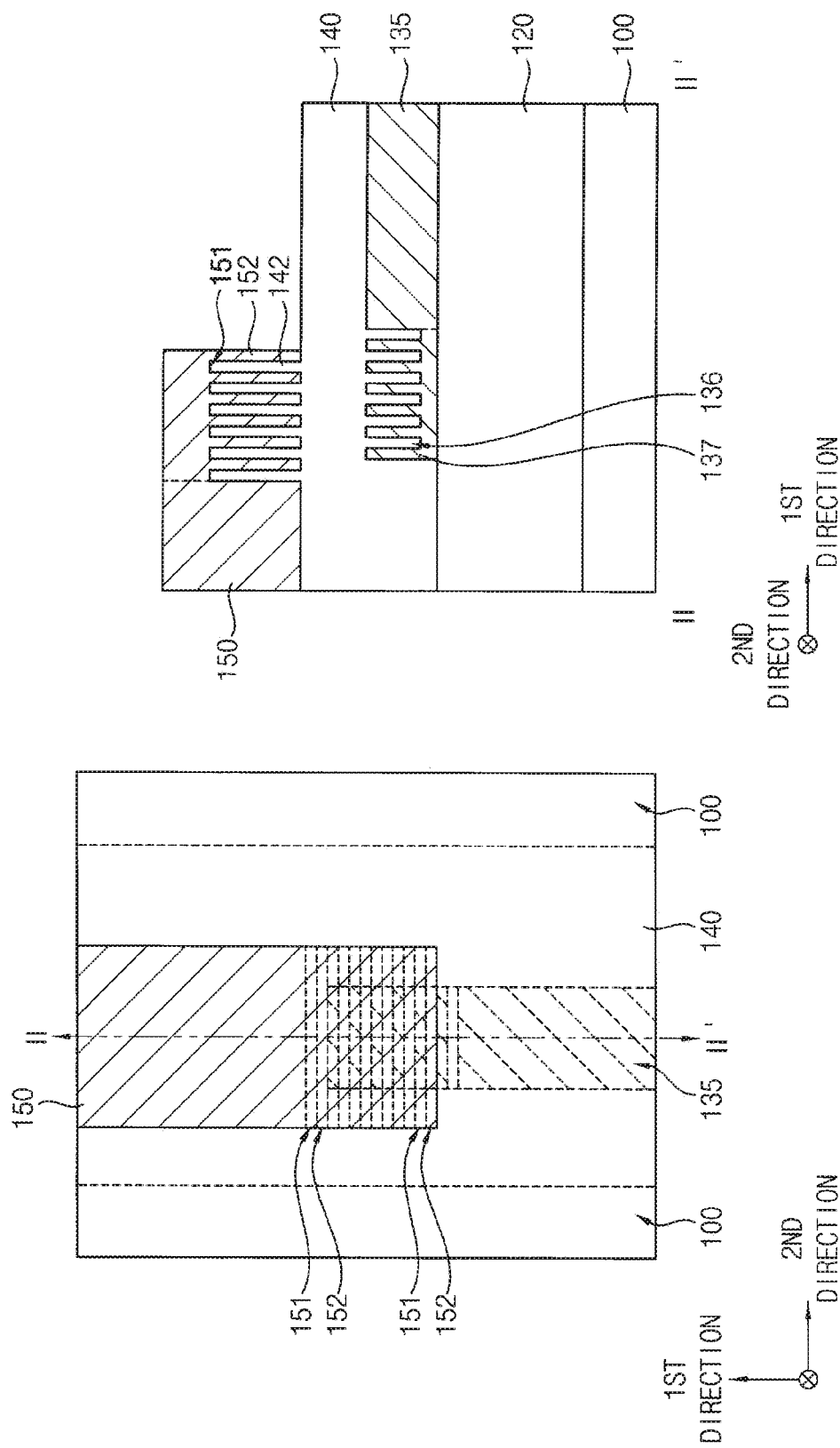

FIGS. 9 to 11 include plan views and cross-sectional views illustrating a method of manufacturing optical integrated circuits in accordance with example embodiments. The cross-sectional views are taken along lines II-IF of corresponding plan views, respectively.

This method may include processes substantially the same as or similar to those illustrated with reference to FIGS. 2 to 4 and FIGS. 1A and 1B, and thus repeated detailed descriptions thereon may be omitted herein.

Referring to FIG. 9, processes substantially the same as or similar to those illustrated with reference to FIGS. 2 to 4 may be performed. However, the second cladding 140 may not be formed.

Thus, the first core 135 may be formed to extend in the first direction on the first cladding 120 in the trench 110 on the substrate 100.

A fourth core 137 may be further formed at an end of the first core 135 in the first direction, which may include substantially the same material as that of the first core 135. A plurality of first recesses 136 may be formed on an upper surface of the fourth core 137.

Referring to FIG. 10, the second cladding 140 may be formed on the substrate 100 and the first cladding 120 to cover the first and fourth cores 135 and 137.

However, protrusions 142 may be formed on the second cladding 140 corresponding to the fourth core 137, which may protrude upwardly in the vertical direction, and thus second recesses 141 may be formed between the protrusions 142.

In example embodiments, each of the protrusions 142 may at least partially overlap the fourth core 137 in the vertical direction, and a width of each of the protrusions 142 in the second direction may be greater than that of each protrusion of the fourth core 137 in the second direction.

Referring to FIG. 11, the second core 150 may be formed on the second cladding 140 to extend in the first direction, and a fifth core 152 may be further formed at an end of the second core 150 in the first direction, which may include substantially the same material as that of the second core 150.

The fifth core 152 may have a thickness in the vertical direction greater than those of the protrusions 142 on the second cladding 140 so as to cover upper surfaces of the protrusions 142, and third recesses 151 may be formed on a lower surface of the fifth core 152, which may correspond to the protrusions 142. In example embodiments, widths of the second and fifth cores 150 and 152 in the second direction may be substantially equal to those of the protrusions 142 on the second cladding 140 in the second direction.

In example embodiments, the second and fifth cores 150 and 152 may include a material having a refractive index lower than those of the first and fourth cores 135 and 137 and higher than those of the first and second claddings 120 and 140, e.g., silicon nitride.

Referring to FIG. 8 again, the third cladding 160 may be formed on the second cladding 140 to cover the second and fifth cores 150 and 152, and thus the fabrication of the optical integrated circuits may be completed.

Figure 12:
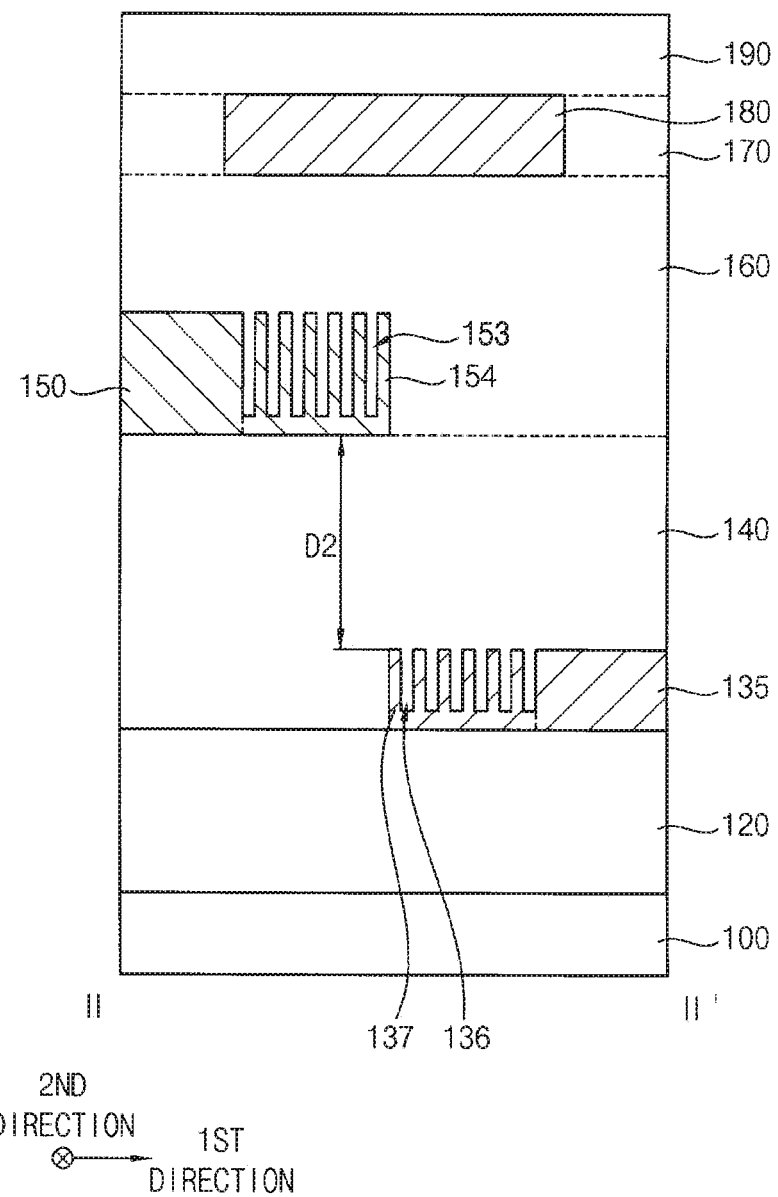
FIG. 12 is a cross-sectional view illustrating optical integrated circuits in accordance with example embodiments.

FIG. 12 is a cross-sectional view illustrating optical integrated circuits in accordance with example embodiments.

These optical integrated circuits may be substantially the same as or similar to those illustrated with reference to FIG. 8, except for a fifth/sixth passive device and a reflecting plate. Thus, like reference numerals refer to like elements, and repeated detailed descriptions thereon may be omitted herein.

Referring to FIG. 12, the optical integrated circuits may include the first cladding 120 in the trench 110 on the substrate 100, the first and fourth cores 135 and 137 connected with each other on the first cladding 120, the second cladding 140 covering the first and fourth cores 135 and 137 on the substrate 100 and the first cladding 120, the second core 150 and a sixth core 154 connected with each other on the second cladding 140, a fourth cladding 170 on the third cladding 160, a reflecting plate 180 extending through the fourth cladding 170, and a fifth cladding 190 on the fourth cladding 170 and the reflecting plate 180.

The sixth core 154 may be connected to an end of the second core 150 in the first direction, and may include substantially the same material as that of the second core 150. The sixth core 154 may include a plurality of fourth recesses 153 on an upper surface thereof. In example embodiments, the sixth core 154 may not overlap the fourth core 137 in the vertical direction, and may be spaced apart from each other by a second distance D2 in the second direction D2. The second distance D2 may be greater than the first distance D1 by which the fourth and fifth cores 137 and 152 are spaced apart from each other in the vertical direction illustrated with reference to FIG. 8.

In example embodiments, the second and sixth cores 150 and 154 may include a material having a refractive index lower than those of the first and fourth cores 135 and 137 and higher than those of the first to fifth claddings 120, 140, 160, 170 and 190, e.g., silicon nitride. The fourth and fifth claddings 170 and 190 may include substantially the same material as that of the first to third claddings 120, 140 and 160, so as to be merged with one or ones (i.e., one or more) of the first to third claddings 120, 140 and 160.

The reflecting plate 180 may partially overlap the fourth and sixth cores 137 and 154 in the vertical direction. The reflecting plate 180 may include a metal, e.g., copper, aluminum, etc.

The fourth core 137 and the first and second claddings 120 and 140 surrounding the fourth core 137 may form a fifth passive device, and the sixth core 154 and the second and third claddings 140 and 160 may form a sixth passive device. The fifth and sixth passive devices may form first and third optical couplers, respectively.

In example embodiments, optical signals emitted from one of the first and third optical couplers spaced apart from each other by the second distance D2 in the vertical direction may be reflected by the reflecting plate 180 to be transferred to the other one of the first and third optical couplers.

As illustrated above, the second and sixth cores 150 and 154 may include, e.g., silicon nitride, and thus light loss may be reduced.

Figure 13:
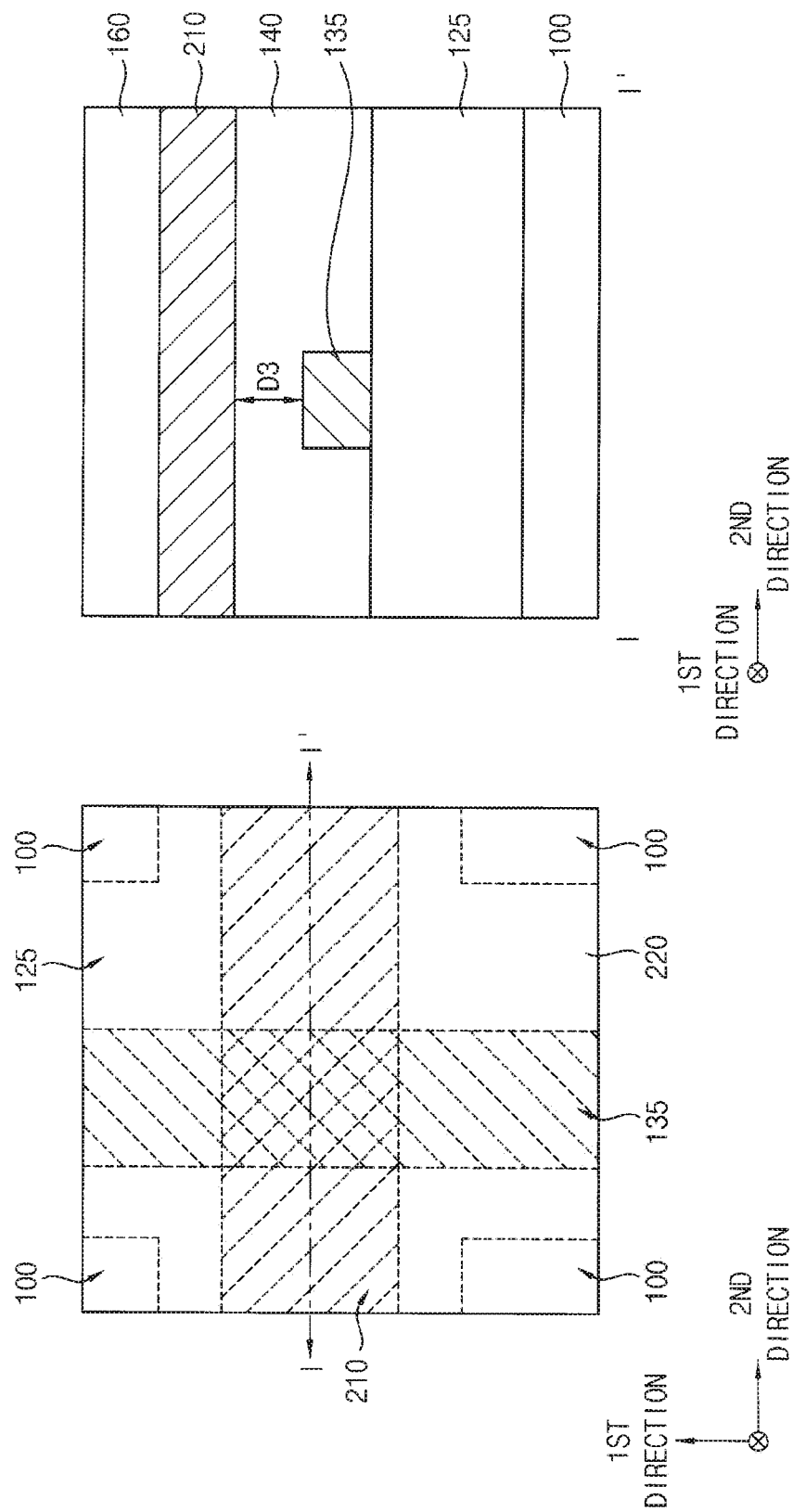
FIG. 13 includes a plan view and a cross-sectional view illustrating optical integrated circuits in accordance with example embodiments.

FIG. 13 includes a plan view and a cross-sectional view illustrating optical integrated circuits in accordance with example embodiments.

These optical integrated circuits may be substantially the same as or similar to those illustrated with reference to FIG. 1A, except for a sixth cladding and a seventh core. Thus, like reference numerals refer to like elements, and repeated detailed descriptions thereon may be omitted herein.

Referring to FIG. 13, the optical integrated circuits may include a sixth cladding 125 and a seventh core 210 instead of the first cladding 120 and the second core 150 in FIG. 1A.

The sixth cladding 125 may extend in each of the first and second directions. The first core 135 may extend in the first direction on the sixth cladding 125, and the seventh core 210 may extend in the second direction crossing the first direction on the second cladding 140. Thus, the seventh core 210 may be formed at a different level from the first core 135 to be spaced apart therefrom by a third distance D3, and may cross the first core 135. An entire portion (e.g., an entire lower surface) of the seventh core 210 may overlap the sixth cladding 125 in the vertical direction.

The first and seventh cores 135 and 210 may not extend primarily/predominantly (i.e., longer than in any other direction) in a parallel direction with each other but rather may cross each other, and thus the interference therebetween may be reduced. Accordingly, the first and seventh cores 135 and 210 may be formed with a freer layout.

Figure 14:
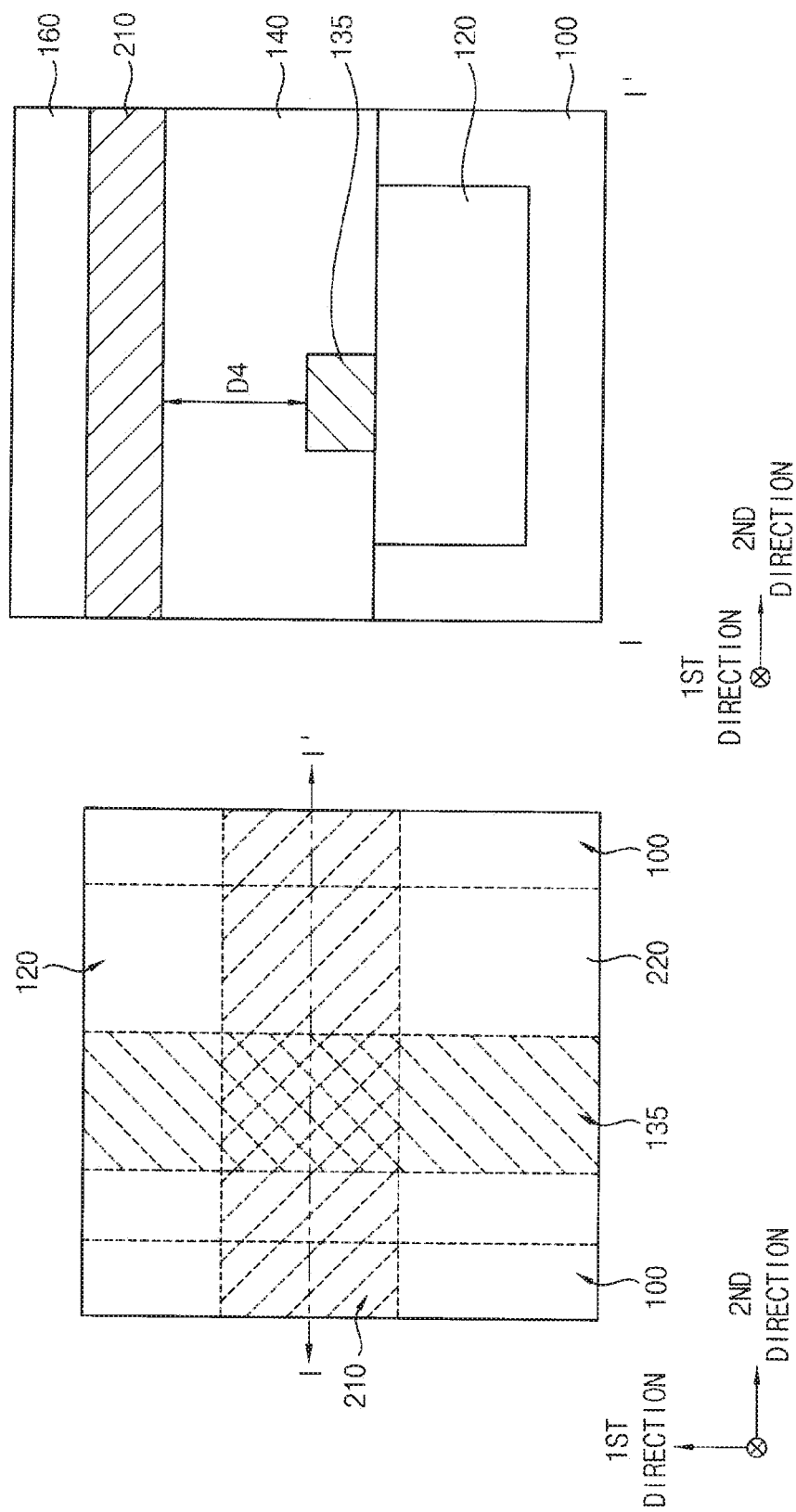
FIG. 14 includes a plan view and a cross-sectional view illustrating optical integrated circuits in accordance with example embodiments.

FIG. 14 includes a plan view and a cross-sectional view illustrating optical integrated circuits in accordance with example embodiments.

These optical integrated circuits may be substantially the same as or similar to those illustrated with reference to FIG. 13, except for a sixth cladding. Thus, like reference numerals refer to like elements, and repeated detailed descriptions thereon may be omitted herein.

Referring to FIG. 14, the optical integrated circuits may include the first cladding 120 in FIG. 1A instead of the sixth cladding 125 in FIG. 13.

The seventh core 210 extending primarily/predominantly in the second direction may be formed on the first core 135 extending primarily/predominantly in the first direction. The first cladding 120 extending in the first direction, however, may be formed on the substrate 100 instead of the sixth cladding 125 extending in each of the first and second directions. Thus, one or more portions of the seventh core 210 may not overlap (e.g., may extend in the second direction beyond) the first cladding 120 in the vertical direction. Numerical terms, such as "sixth" or "seventh," may be used herein for convenience in differentiating between elements, which thus may alternatively be referred to as "first" or "second" elements. For example, the term "seventh," when referring to the core 210, does not, by itself, require six other cores in the same circuit.

The seventh core 210 and the first core 135 may be spaced apart from each other by a fourth distance D4 greater than the third distance D3 in the vertical direction, so that the second cladding 140 under the seventh core 210 may have a sufficiently large thickness. Thus, the first cladding 120 need not be formed under each portion of the seventh core 210.

Accordingly, when an active device including single crystalline silicon and a passive device are formed at different levels, if the active device and the passive device are spaced apart from each other by a sufficiently large distance, the passive device may be freely formed regardless of the trench layout on the substrate.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concepts. Accordingly, all such modifications are intended to be included within the scope of the present inventive concepts as defined in the claims.

What is claimed is:

1. An optical integrated circuit comprising:
a substrate comprising a single crystalline semiconductor material;
an insulation region in a trench in the substrate;
an active device comprising a first core on the insulation region, the first core comprising the single crystalline semiconductor material; and
a passive device comprising a second core having a non-tapered end that is spaced apart from a tapered end of the first core,
wherein the second core comprises a material comprising a refractive index that is lower than that of the first core,
wherein the insulation region comprises a first insulation region,
wherein the optical integrated circuit further comprises a second insulation region that is on the substrate, the first insulation region, and the first and second cores, and
wherein a lower surface of the first core directly contacts the first insulation region and is lower than an upper surface of the substrate.

2. The optical integrated circuit of claim 1,
wherein the single crystalline semiconductor material of the first core comprises single crystalline silicon, and
wherein the material of the second core comprises silicon nitride.

3. The optical integrated circuit of claim 1, wherein the passive device comprises an optical waveguide.

4. The optical integrated circuit of claim 1,
wherein the first and second cores are spaced apart from each other in a vertical direction that is substantially perpendicular to the upper surface of the substrate, and
wherein the non-tapered end of the second core overlaps the tapered end of the first core in the vertical direction.

5. The optical integrated circuit of claim 4,
wherein an entirety of a lowermost surface of the second core overlaps the insulation region in the vertical direction, and
wherein the lowermost surface of the second core is wider than the lower surface of the first core.

6. The optical integrated circuit of claim 1,
wherein the first and second cores are spaced apart from each other in a vertical direction that is substantially perpendicular to the upper surface of the substrate,
wherein the passive device comprises a first passive device, and
wherein the optical integrated circuit further comprises:
a second passive device comprising a third core that is connected to the first core of the active device, the third core comprising the single crystalline semiconductor material; and
a third passive device comprising a fourth core that is connected to the second core of the first passive device, the fourth core comprising the material of the second core and overlapping at least a portion of the third core in the vertical direction.

7. The optical integrated circuit of claim 6, wherein the second and third passive devices comprise first and second optical couplers, respectively.

8. The optical integrated circuit of claim 7, further comprising a reflecting plate on and spaced apart from the second and third passive devices,
wherein the reflecting plate is configured to reflect light that is emitted from the first optical coupler to the second optical coupler, or to reflect light that is emitted from the second optical coupler to the first optical coupler.

9. The optical integrated circuit of claim 1,
wherein the first and second cores are spaced apart from each other in a horizontal direction that is substantially parallel to the upper surface of the substrate, and
wherein the first and second cores at least partially overlap each other in the horizontal direction.

10. The optical integrated circuit of claim 9, wherein an entirety of a lowermost surface of the second core overlaps the insulation region in a vertical direction that is substantially perpendicular to the upper surface of the substrate.

11. The optical integrated circuit of claim 1, wherein each of the first and second cores extends primarily in a direction that is substantially parallel to the upper surface of the substrate.

12. The optical integrated circuit of claim 1,
wherein the first core extends primarily in a first direction that is substantially parallel to the upper surface of the substrate, and
wherein the second core extends primarily in a second direction that is substantially parallel to the upper surface of the substrate and crosses the first direction.

13. The optical integrated circuit of claim 12, wherein an entirety of a lowermost surface of the second core overlaps the insulation region in a vertical direction that is substantially perpendicular to the upper surface of the substrate.

14. The optical integrated circuit of claim 12, wherein at least a portion of the second core does not overlap the insulation region in a vertical direction that is substantially perpendicular to the upper surface of the substrate.

* * * * *